(12) United States Patent
Van Keulen (10) Patent No.: US 10,173,232 B2
(45) Date of Patent: Jan. 8, 2019

(54) MULTI-POINT SEAL LUBRICATION SYSTEM

(71) Applicant: Graco Minnesota Inc., Minneapolis, MN (US)

(72) Inventor: Dennis J. Van Keulen, Rogers, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 273 days.

(21) Appl. No.: 14/904,298

(22) PCT Filed: Jul. 18, 2014

(86) PCT No.: PCT/US2014/047191
§ 371 (c)(1),
(2) Date: Jan. 11, 2016

(87) PCT Pub. No.: WO2015/010018
PCT Pub. Date: Jan. 22, 2015

(65) Prior Publication Data
US 2016/0146201 A1    May 26, 2016

Related U.S. Application Data (60) Provisional application No. 61/856,104, filed on Jul. 19, 2013.

(51) Int. Cl.
*F04B 39/02* (2006.01)
*F04B 39/10* (2006.01)
(Continued)

(52) U.S. Cl.
CPC .............. *B05B 7/1254* (2013.01); *B05B 7/04* (2013.01); *B05B 7/24* (2013.01); *B05B 9/0406* (2013.01);
(Continued)

(58) Field of Classification Search
CPC ........... B05B 7/1254; B05B 7/04; B05B 7/24; B05B 9/0413; B05B 12/087;
(Continued)

(56) References Cited

U.S. PATENT DOCUMENTS 2,266,125 A    12/1941  Malsbary et al.
3,011,808 A    12/1961  Tucker et al.
(Continued)

FOREIGN PATENT DOCUMENTS

CN    101432521 A    5/2009
CN    201301807 Y    9/2009
(Continued)

OTHER PUBLICATIONS

Extended European Search Report for EP Application No. 14826261.1, dated May 19, 2017, 10 pages.
(Continued)

*Primary Examiner* — Michael R Mansen
*Assistant Examiner* — Mark K Buse
(74) *Attorney, Agent, or Firm* — Kinney & Lange, P.A.

(57) ABSTRACT

A spray system includes a fluid source, a sprayer, a pump cylinder, a plunger, a pump motor, first and second inlet and outlet valves, a plurality of valve seals, a seal lubricant reservoir, and gravity fed seal lubricant lines. The pump cylinder is disposed fluidly between the fluid source and the sprayer. The plunger is situated within the pump cylinder and positioned by a displacement rod. The pump motor is configured to drive the displacement rod so as to reciprocate the plunger within the pump cylinder. The valve seals are disposed about the each of the first and second inlet and outlet valves. The lubricant seal lines carry seal lubricant from the reservoir to each of the valve seals.

10 Claims, 4 Drawing Sheets

(51) Int. Cl.

| | |
|---|---|
| *B05B 9/04* | (2006.01) |
| *F04B 13/00* | (2006.01) |
| *B05B 7/12* | (2006.01) |
| *F16N 7/32* | (2006.01) |
| *B05B 7/04* | (2006.01) |
| *B05B 12/08* | (2006.01) |
| *F04B 17/03* | (2006.01) |
| *F04B 23/06* | (2006.01) |
| *F04B 49/10* | (2006.01) |
| *F04B 51/00* | (2006.01) |
| *B05B 7/24* | (2006.01) |
| *F04B 7/02* | (2006.01) |
| *F04B 19/22* | (2006.01) |
| *B05B 12/14* | (2006.01) |
| *F04B 49/22* | (2006.01) |
| *F04B 53/10* | (2006.01) |
| *F04B 53/14* | (2006.01) |
| *F04B 53/16* | (2006.01) |
| *F04B 5/02* | (2006.01) |
| *F04B 15/02* | (2006.01) |
| *F04B 53/18* | (2006.01) |
| *B05B 15/55* | (2018.01) |
| *G05D 11/13* | (2006.01) |
| *G05D 16/20* | (2006.01) |

(52) U.S. Cl.
CPC .......... *B05B 9/0413* (2013.01); *B05B 12/087* (2013.01); *B05B 12/149* (2013.01); *B05B 12/1418* (2013.01); *B05B 15/55* (2018.02); *F04B 5/02* (2013.01); *F04B 7/02* (2013.01); *F04B 13/00* (2013.01); *F04B 15/02* (2013.01); *F04B 17/03* (2013.01); *F04B 19/22* (2013.01); *F04B 23/06* (2013.01); *F04B 39/0292* (2013.01); *F04B 39/10* (2013.01); *F04B 49/10* (2013.01); *F04B 49/22* (2013.01); *F04B 51/00* (2013.01); *F04B 53/10* (2013.01); *F04B 53/14* (2013.01); *F04B 53/16* (2013.01); *F04B 53/18* (2013.01); *F16N 7/32* (2013.01); *B05B 7/0408* (2013.01); *B05B 7/2486* (2013.01); *B05B 7/2497* (2013.01); *B05B 9/04* (2013.01); *F04B 2201/0601* (2013.01); *F04B 2201/0603* (2013.01); *G05D 11/132* (2013.01); *G05D 16/2073* (2013.01)

(58) Field of Classification Search
CPC .. B05B 12/1418; F04B 39/0292; F04B 13/00; F04B 39/10
USPC .............................................................. 184/6
See application file for complete search history.

(56) References Cited

U.S. PATENT DOCUMENTS

| | | | |
|---|---|---|---|
| 4,119,113 A | 10/1978 | Meginniss, III | |
| 4,278,205 A | 7/1981 | Binoche | |
| 5,403,168 A | 4/1995 | Evenson | |
| 6,302,401 B1 | 10/2001 | Palmour | |
| 6,315,442 B1 | 11/2001 | Jerkel | |
| 6,480,404 B2 | 11/2002 | Giraud et al. | |
| 6,840,404 B1 * | 1/2005 | Schultz | B01F 15/0466 222/137 |
| 8,356,696 B1 | 1/2013 | Carroll et al. | |
| 2004/0050961 A1 | 3/2004 | Rosenauer et al. | |
| 2004/0104244 A1 | 6/2004 | Cline et al. | |
| 2007/0175705 A1 * | 8/2007 | Adolf | F01L 3/08 184/6.5 |
| 2011/0006484 A1 | 1/2011 | Dielte et al. | |
| 2011/0020157 A1 * | 1/2011 | Schmidt | F04B 15/02 417/437 |
| 2011/0114674 A1 | 5/2011 | Nicolle et al. | |
| 2016/0146201 A1 * | 5/2016 | Van Keulen | F16N 7/32 222/333 |
| 2016/0153441 A1 * | 6/2016 | Fehr | B05B 7/04 73/168 |
| 2016/0167076 A1 * | 6/2016 | Fehr | B05B 7/04 239/104 |

FOREIGN PATENT DOCUMENTS

| | | |
|---|---|---|
| EP | 0451942 A1 | 10/1991 |
| FR | 2439311 A1 | 5/1980 |
| JP | H10281057 A | 10/1998 |
| JP | 2012250146 A | 12/2012 |
| WO | WO95/16167 A1 | 6/1995 |

OTHER PUBLICATIONS

First Office Action from Japanese Patent Application No. 201480040380.X, dated May 26, 2017, 9 pages.
International Search Report and Written Opinion from PCT Application Serial No. PCT/US2014/047191, dated Nov. 6, 2014, 10 pages.

\* cited by examiner

MULTI-POINT SEAL LUBRICATION SYSTEM

BACKGROUND

The present invention relates generally to applicator systems that are used to spray fluids, such as paint, sealants, coatings, and the like. More particularly, the invention relates to a lubrication subsystem for seals of a spray system.

Some fluid applicators have separate "A-side" and "B-side" fluid systems (e.g. pumps, reservoirs, and fluid lines) that carry different fluids components. These components are isolated until sprayed or otherwise applied, whereupon the components mix and chemically interact to form an application material. Two-component fluid spray systems are commonly used to apply epoxies, foams, and two-component paints. Paint systems, for example, may combine A-side paints with B-side catalyst materials. Common catalyst materials include isocyanates, polyesters, epoxies, and acrylics. Different paints or other A-side materials may require different B-side catalysts.

A- and B-side fluid systems typically comprise separate fluid sources (e.g. reservoirs or lines) that are pumped via separate pumps to a common sprayer head actuated by a human operator or an automated machine process. Required spray pressures vary as a function of material and application, and desired flow rates of A- and B-side fluids often differ. Paints and catalysts intended to be combined in a 10-to-1 ratio, for instance, will necessitate A-side pump displacement ten times greater than B-side pump displacement.

Spray system pumps have several moving parts that must be sealed against fluid ingress or egress. Reciprocating cylinder pumps typically have inlet and outlet valves and reciprocation bearings that must be sealed. Paint and catalyst materials can cure on the back side of these seals, damaging parts during start-up and extended use.

SUMMARY

In a first embodiment, a spray system includes a fluid source, a sprayer, a pump cylinder, a plunger, a pump motor, first and second inlet and outlet valves, a plurality of valve seals, a seal lubricant reservoir, and gravity fed seal lubricant lines. The pump cylinder is disposed fluidly between the fluid source and the sprayer. The plunger is situated within the pump cylinder and positioned by a displacement rod. The pump motor is configured to drive the displacement rod so as to reciprocate the plunger within the pump cylinder. The valve seals are disposed about the each of the first and second inlet and outlet valves. The lubricant seal lines carry seal lubricant from the reservoir to each of the valve seals In a second embodiment a lubricated pumping system includes a metering cylinder, a plunger situated on a displacement rod within the metering cylinder, a motor attached to the displacement rod to reciprocate the plunger, and a rod reservoir situated at an opposite axial extent of the metering cylinder from the motor, and sized to accept the displacement rod. A first displacement rod bearing is disposed between the metering cylinder and the motor, while a second displacement rod bearing is disposed between the metering cylinder and the rod reservoir. First and second inlet and outlet valves are disposed along fluid paths to and from the metering cylinder. A plurality of lubricated seals are disposed about each of the first and second inlet valves, the first and second outlet valves, and the first and second displacement rod bearings. A lubricant reservoir situated at an elevated position relative to the metering cylinder is fluidly connected to the lubricated seals.

DETAILED DESCRIPTION

The present invention relates to a multi-point lubrication subsystem for a pump of a two-component spray system such as a combined paint-catalyst sprayer. A single lubricant reservoir is connected via gravity feed lines to a plurality of pump seals.

Figure 1:
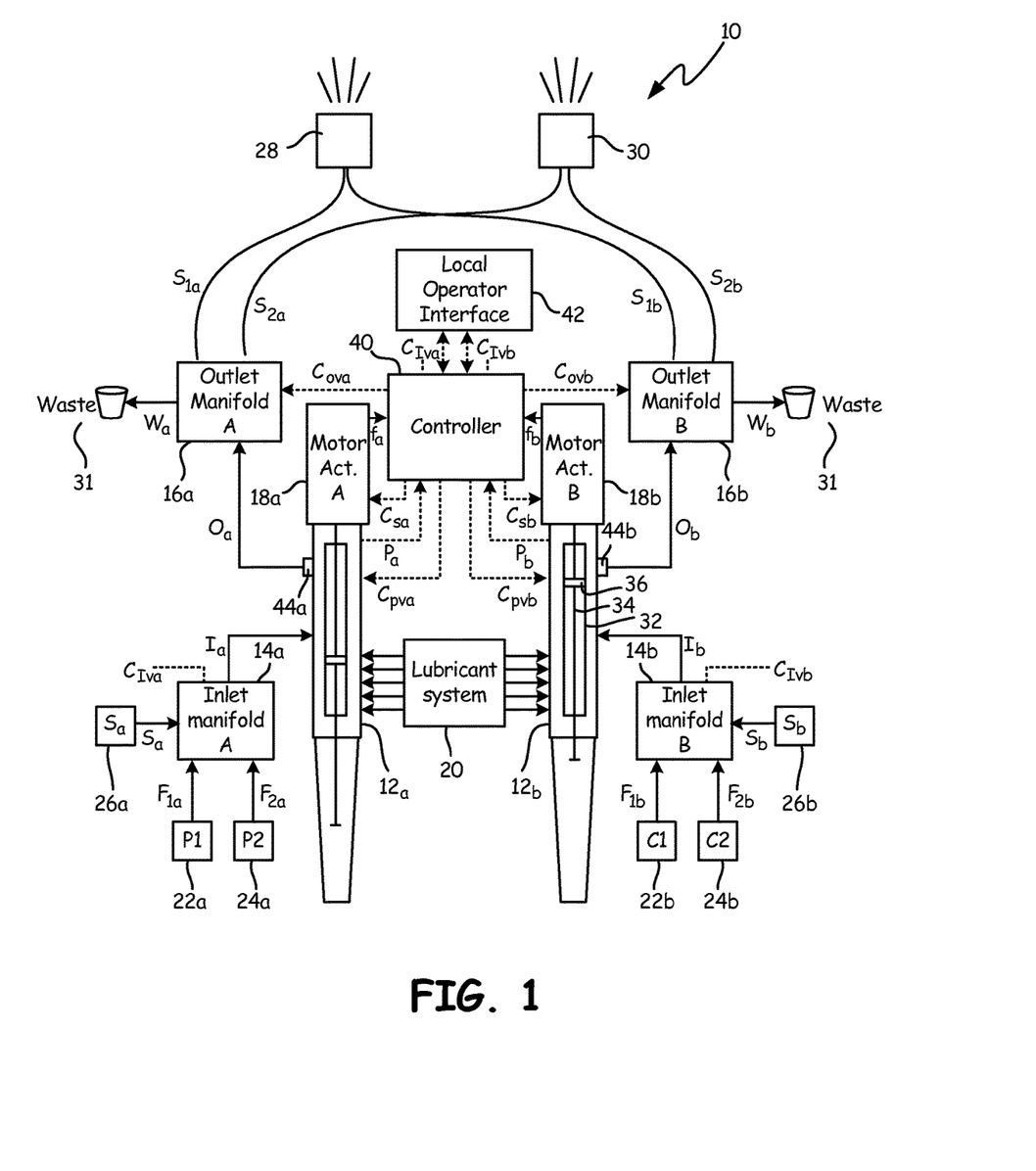
FIG. 1 is a schematic view of a spray system

FIG. 1 is a schematic diagram of spray system 10, a two-side spray system with an A-side and a B-side configured to carry separate fluid components that are only combined when sprayed. Spray system 10 can, for example, combine an A-side paint with a B-side catalyst (e.g. a polyurethane, acrylic, polyester, or epoxy) at the moment of spraying. Although spray system 10 will be discussed hereinafter primarily as a system for spraying paint, the present invention can analogously be applied to sprayers for foam, adhesive, and other materials. Many components of spray system 10 are present in parallel on both A- and B-sides of the system. For clarity, A-side components are labeled with an "a" subscript, while B-side components are labeled with a "b" subscript. Hereinafter, reference numbers without subscript will be used to refer generically to elements found in parallel on both A- and B-sides of spray system 10, and to single elements common to both sides, while particular A- or B-side counterparts will be denoted with "a" or "b" subscripts, as appropriate. "Pump 12a" and "pump 12b," for example, are specific elements of the A- and B-side subsystems of spray system, respectively. Description related to "pump 12" (without subscript) refers generically to pump.

Spray system 10 includes A- and B-side pumps 12 that pump fluid from inlet manifolds 14 via inlet lines $I_a$ and $I_b$ to outlet manifolds 16 via outlet lines $O_a$ and $O_b$. In the depicted embodiment, pumps 12 are double-action reciprocating cylinder pumps driven by motorized actuators 18, with seals lubricated by lubricant system 20. Motorized actuators 18 can, for example, be linear DC step motors. Lubricant system 20 includes at least one lubricant reservoir and fluid routing lines suited to carry lubricant from lubricant system 20 to valve seals and other throat seals of pumps 12. Although lubricant system 20 is illustrated as a unitary system, some embodiments of spray system 10 can use separate A- and B-side lubricant systems, e.g with different lubricants.

Inlet and outlet manifolds 14 and 16, respectively, are valved manifolds that selectively couple pumps 12 to a plurality of fluid sources and outputs. Inlet and outlet manifolds 14 and 16 allow spray system 10 to switch between a plurality of connected fluids without any need to disconnect or reconnect fluid lines. Although each outlet manifold 16 is depicted with three outlets and each inlet manifold 14 is depicted with three inlets, any number of inlets and outlets can be used. Under ordinary operating conditions, valving in manifolds 14 and 16 allows only one input or output line to be open at a time. In some embodiments, inlet and outlet manifolds 14 and 16 are controlled electronically, as discussed in greater detail below with respect to controller 40. In other embodiments, inlet and outlet manifolds 14 and 16 can be actuated manually. Some embodiments of spray system 10 can allow for both electronic and manual valve actuation of inlet and outlet manifolds 14 and 16.

In the depicted embodiment, inlet manifolds 14 selectively connect pumps 12 to primary fluid sources 22 and 24 via fluid lines $F_1$ and $F_2$, respectively, and to solvent sources 26 via solvent lines S. Primary fluid sources 22a and 24a can, for example, be first and second paints P1 and P2, while primary fluid sources 22b and 24b can, for example, be first and second catalyst fluids C1 and C2. Solvent sources 26a and 26b can draw upon a common reservoir of solvent material, or can use different solvent materials.

In the depicted embodiment, outlet manifolds 16 similarly selectively connect pumps 12 to sprayers 28 and 30 via spray lines $S_1$ and $S_2$, and to waste fluid dump 31 via waste lines W. Waste fluid dump 31 accepts waste paint, catalyst, and solvent flushed from spray system 10 (e.g. when switching from first paint P1 and first catalyst fluid C1 to second paint P2 and second catalyst fluid C2). Sprayers 28 and 30 each accept spray lines from both A-side and B-side outlet manifolds 16. Sprayer 28, for example, accepts spray line $S_{1a}$ from A-side outlet manifold $16_a$ and spray line $S_{1b}$ from B-side outlet manifold $16_b$. Although only two sprayers 28 and 30 are depicted in FIG. 1, any number of separate sprayers can be used. Each sprayer can be dedicated to a single spray fluid combination (e.g. of paint and catalyst), to avoid mixture or fouling of different fluids. Accordingly, embodiments with additional fluid sources advantageously include additional sprayers, as well. Alternatively, sprayers need not be devoted to particular fluid combinations, but can be used sequentially for multiple different fluid combinations, if washed between spray sessions with different fluids. Sprayers 28 and 30 can, for example, be user-triggered spray guns or machine-actuated automatic sprayers.

In some embodiments, primary fluid sources 22 and 24 and solvent sources 26 are pre-pressurized sources capable of supplying at least 50% of output pressure of pumps 12. Pre-pressurized sources alleviate pumping load on motorized actuators 18, such that pumps 12 need only supply less than 50% (per the previously stated case) of output pressure. Sources 22, 24, and 26 can include dedicated pumps for pre-pressurizing fluids.

In the depicted embodiment, pumps 12 are metered linear pumps with dosing cylinders 32 that carry displacement rods 34. Displacement rods 34 are driven by motorized actuators 18, and both situate and drive plungers 36. In some embodiments, dosing cylinders 32, displacements rods 34, and plungers 36 may be balanced in working surface area so as to receive equal pressure from pre-pressurized sources (e.g. 22, 24) on up- and down-strokes.

The motor speed of motorized actuators 18 is variable, and determines the displacement of pumps 12. Displacement rods 34 extend into rod reservoirs 38, which can in some embodiments be flooded with lubricant from lubricant system 20. Pumps 12 each have inlet and outlet valves that actuate between up- and down-strokes of displacement rods 34 to direct fluid above or below plungers 36.

Spray system 10 is controlled by controller 40. Controller 40 is a computing device such as a microprocessor or collection of microprocessors with associated memory and local operator interface 42. Local operator interface 42 is a user interface device with, e.g. a screen, keys, dials, and/or gauges. In some embodiments of the present invention, local operator interface 42 can be a wired or wireless connection for a user operated tablet or computer. In other embodiments, local operator interface 42 can be an integrated interface configured to accept direct user input and provide diagnostic and operational data directly to a user. Local operator interface 42 can, for example, enable a user to input target ratios of A- and B-side fluid flow for each combination of A- and B-side fluids, and target output pressure. Local operator interface 42 can also provide users with diagnostic information including but not limited to failure identifications (e.g. for clogging or leakage), spray statistics (e.g. fluid volume sprayed or remaining), and status indications (e.g. "cleaning," "spraying," or "offline"). In some embodiments, controller 40 may include a database of known or previous configurations (e.g. target ratios and/or pressures for particular materials), such that a user at local operator interface 42 need only select a configuration from several options.

Controller 40 controls motorized actuators 18 via motor speed control signals $c_s$ and controls pump valving of pumps 12 via pump valve control signals $c_{PV}$. Controller 40 synchronizes valve actuation of pumps 12 with pump changeover to minimize downtime as plungers 36 reaches the top or bottom of their travel distances within dosing cylinder 32. In some embodiments, controller 40 may also control valving of inlet manifolds 14 and outlet manifolds 16 via inlet valve control signals $c_{IV}$ and outlet valve control signals $c_{OV}$, respectively. Controller 40 receives sensed pressure values $P_a$ and $P_b$ from pressure sensors 44a and 44b, respectively, and receives encoder feedback data $f_a$ and $f_b$ reflecting motor states from motorized actuators 18a and 18b, respectively.

Pumping system 10 provides substantially uniform and continuous spray pressure through pump changeovers at specified pressures and material ratios. Pumping system 10 enables clean and efficient pumping and fluid switching without risk of fluid contamination, and without need for lengthy downtimes or large volume use of washing solvents.

Figure 2:
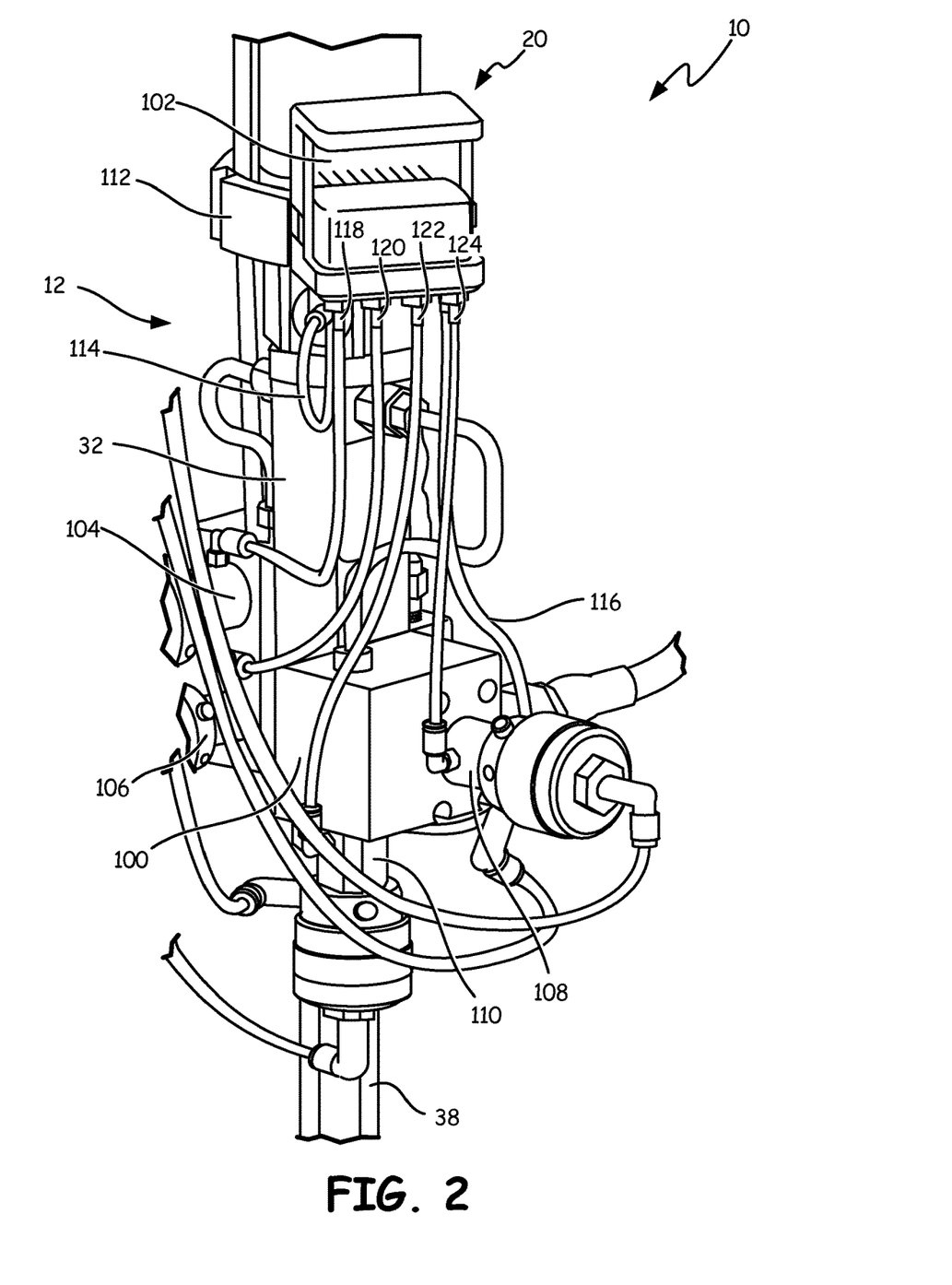
FIG. 2 is a perspective view of a pump and lubrication apparatus for the spray system of FIG. 1.

FIG. 2 is a perspective view of a portion of spray system 10 around pump 12. As described above with respect to FIG. 1, pump 12 may equivalently be an A-side pump (12a) or a B-side pump (12b), generality. FIG. 2 illustrates motorized actuator 18, lubricant system 20, dosing cylinder 32, rod reservoir 38, pump body 100, lubricant reservoir 102, inlet valves 104 and 106, outlet valves 108 and 110, lubricant mount 112, and lubricant lines 114, 116, 118, 120, 122, and 124.

As described above with respect to FIG. 1, pump 12 is a double-action pump with dosing cylinder 32. Pump body 100 includes structural elements of pump 12 (including internal fluid passages) not a part of dosing cylinder 32. Pump body 100 houses inlet and outlet valves 104, 106, 108, and 110, which controller 40 selectively actuates to route fluid to and from top or bottom portions of dosing cylinder 32 during up- and down-strokes of plunger 36 and displacement rod 34 (not shown in FIG. 2; see FIG. 1). Inlet and outlet valves 104, 106, 108, and 110 can, by way of example, be pin or gate valves.

Lubricant system 20 includes lubricant reservoir 102, lubricant mount 112, and lubricant lines 114, 116, 118, 120, 122, and 124. Lubricant reservoir 102 is a fluid container or source containing an appropriate lubricant to the primary fluids circulated through pump 12. Where pump 12 circulates polyurethane or isocyanate catalysts, or other moisture sensitive or absorbing materials, lubricant reservoir 102 can, for example, be filled with non-hygroscopic oil. Where pump 12 circulates paints, polyesters, epoxies, or acrylics, lubricant reservoir 102 can for example be filled with a throat seal lubricant mixture of solvent and plasticizer. Lubricant lines 114, 116, 118, 120, 122, and 124 feed lubricant to valve seals of inlet and outlet valves 104, 106, 108, and 110, and to bearing seals of cylinder 32 (see FIGS. 3-5, discussed below) to prevent primary pumping materials such as paint or catalyst from curing on an inside or back side of these seals. Without lubricated seals, cured material build-up from startup or extended use over time can cause damage or otherwise impede operability of pump 12.

In the depicted embodiment, lubricant reservoir 102 is a pump-specific (i.e. A-side or B-side) reservoir. Different fluids pumped by A- and B-sides of spray system 10 may necessitate different lubricant materials, as described above. Where A- and B-sides of spray system 10 can use identical lubricants, lubricant reservoir 102 can in some embodiments be a common reservoir shared by both A- and B-side systems.

Lubricant mount 112 is a support bracket that secures lubricant reservoir at an elevated position relative to pump 12, such that lubricant lines 114, 116, 118, 120, 122, and 124 are able to carry lubricant to lubricated seals under gravity flow. Although lubricant mount 112 is shown anchoring lubricant reservoir 102 to motorized actuator 18, any nearby elevated position will work.

Inlet and outlet valves 104, 106, 108, and 110 are supplied with lubricant from lubricant reservoir 102 by dedicated lubricant lines 118, 120, 124, and 122, respectively. Each pump valve has a valve seal that is wetted by the lubricant, as described above and depicted below with respect to FIG. 3. Similarly, displacement rod 34 translates along bearings at either end of cylinder 32, which are lubricated to prevent buildup of cured material as discussed below with respect to FIGS. 4 and 5.

Figure 3:
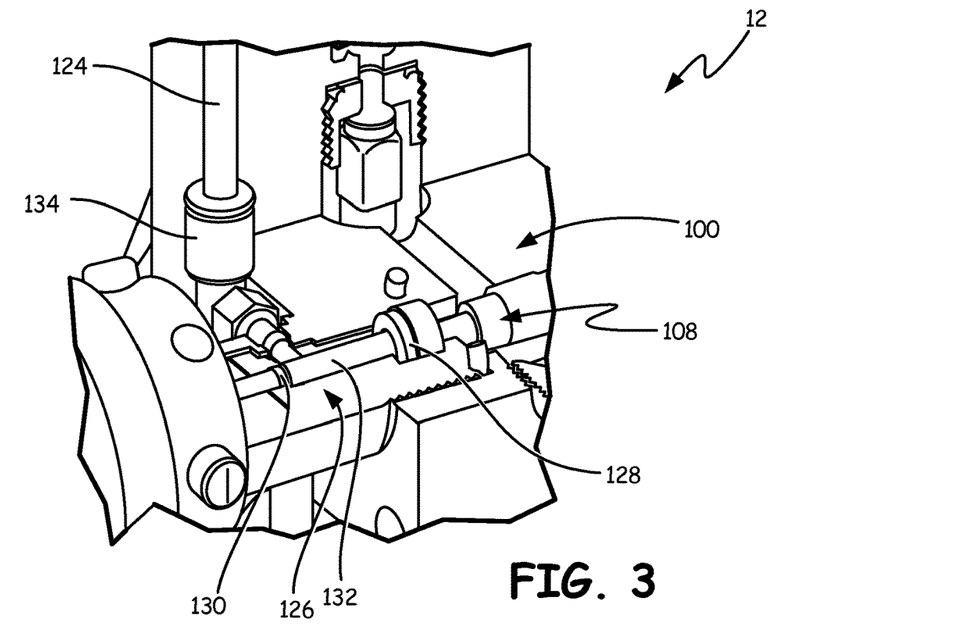
FIG. 3 is a partial cross-sectional view of a lubricated valve seal of the pump of FIG. 2.

FIG. 3 is a partial cross-sectional view of outlet valve 102 and pump 12. Although FIG. 3 depicts outlet valve 108 in particular, the structure and operation of lubrication for valves 104, 106, and 110 can be substantially identical. FIG. 3 illustrates pump body 100, valve 108, lubricant line 124, valve seal assembly 126 defined by first seal 128 and second seal 130, lubricated region 132, and lubricant connection 134. Lubricant connection 134 is a connecting attachment by which fluid line 124 connects to pump body 100, such as a threaded or flanged line head. Valve seal assembly 126 is a multi-element sealing structure comprising first seal 128, second seal 130, and lubricated region 132 located therebetween. Valve seal assembly 126 forms a seal between valve 108 and pump body 100, and prevents egress of primary fluid and/or solvent from pump 12 through valve 108, and resulting damage or deterioration of sensitive components such as valve actuators. In the depicted embodiment, first seal 128 is a main seal and second seal 130 is a backup seal of valve 108. Lubrication from lubricant line 124 flows under gravity into valve seal assembly 126, filling lubricated region 132. The presence of lubricant in lubricated region 132 prevents primary fluids from curing behind first seal 128, and causing damage to valve 108. Valve seal assembly 126 is a lubricated seal that passively receives lubricant from a common reservoir 102 shared with other lubricated seals, thus minimizing maintenance requirements.

Figure 4:
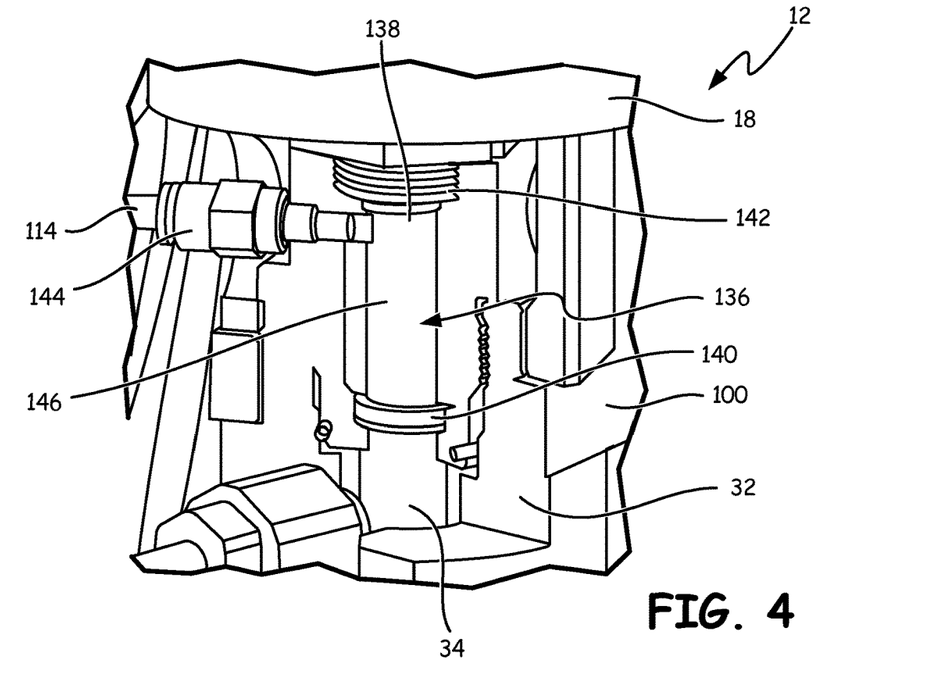
FIG. 4 is a partial cross-sectional view of a first lubricated bearing seal of the pump of FIG. 2.
Figure 5:
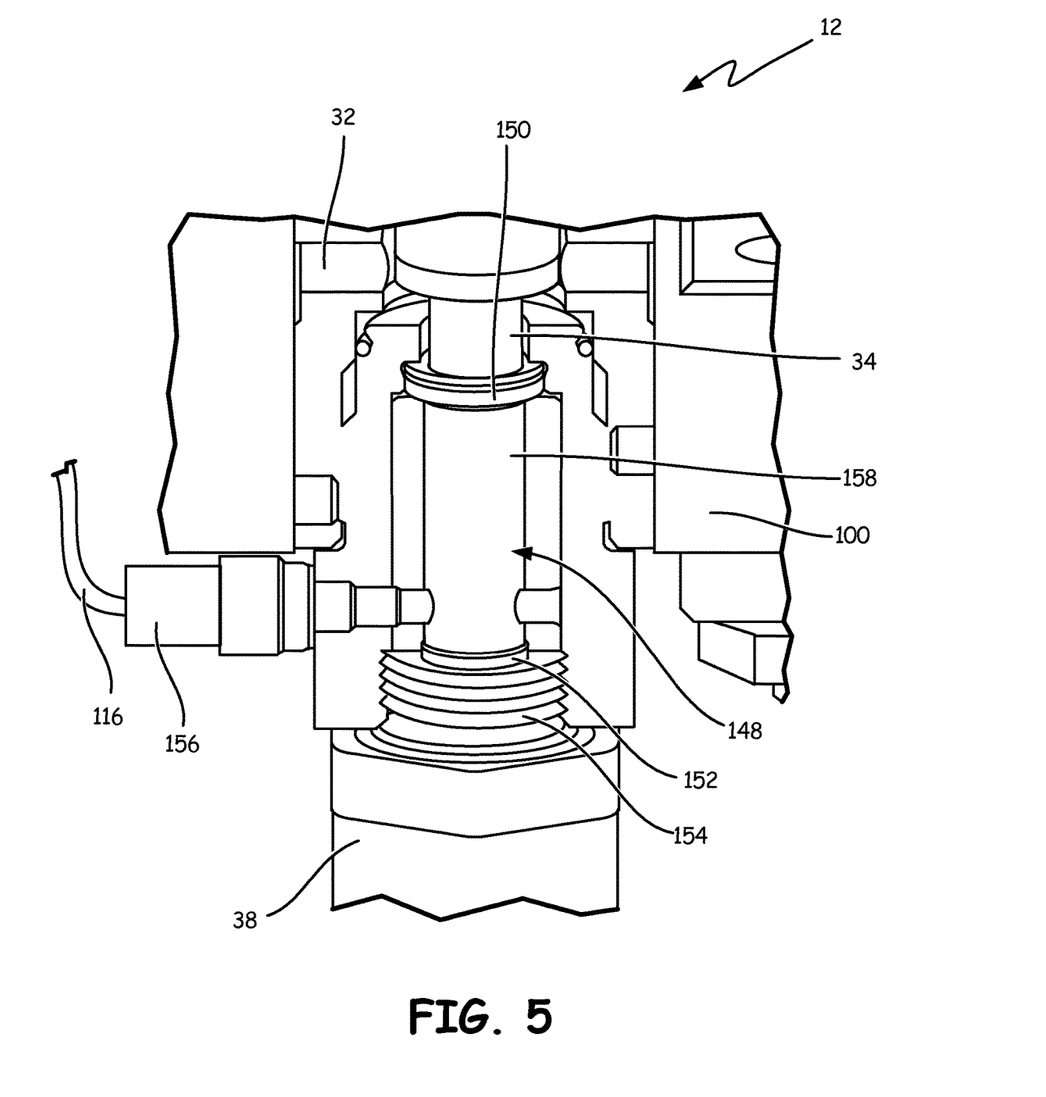
FIG. 5 is a partial cross-sectional view of a second lubricated bearing seal of the pump of FIG. 2.

FIGS. 4 and 5 are partial cross-sectional views of bearing seal assemblies 136 and 148 situated at top and bottom ends of cylinder 32, respectively. FIGS. 4 and 5 illustrate cylinder 32, displacement rod 34, and pump body 100. FIG. 4 further illustrates motorized actuator 18, lubricant line 114, bearing seal assembly 136 defined between first seal 138 and second seal 140, retainer attachment 142, lubricant connection 144, and lubricated region 146. FIG. 5 further illustrates rod reservoir 38, lubricant line 116, bearing seal assembly 148 defined between first seal 150 and second seal 152, retainer attachment 154, lubricant connection 156, and lubricated region 158. Bearing seal assemblies 136 and 148 operate substantially identically to valve seal assembly 125, described above with respect to FIG. 3, save that bearing seal assemblies 136 and 148 protect against primary fluid egress along displacement rod 34, at top and bottom ends of dosing cylinder 32, respectively, rather than at a valve. Retainer attachments 142 and 154 are fastening connections to motorized actuator 18 and rod reservoir 38, respectively. In the depicted embodiment, retainer attachments 142 and 154 are threaded attachment locations, although alternative embodiments may involve different attachment methodologies.

Lubricant from lubricant reservoir 102 flows under gravity through lubricant lines 114 and 116 and lubricant connections 144 and 156 to bearing seal assemblies 136 and 148, respectively. In the depicted embodiment, bearing seal assembly 136 includes lubricated region 146 bracketed by first seal 138 and second seal 140, while bearing seal assembly 148 includes lubricated region 158 bracketed by first seal 150 and second seal 152. Lubricated regions 146 and 158 protect against material curing and accumulation on displacement rod 32, in much the same way that lubricated region 132 protects against material curing and buildup at valve 108 (described above with respect to FIG. 3).

In some embodiments of spray system 10, second seal 152 may be omitted to allow lubricant from lubricant line 116 and lubricant connection 156 to flood rod reservoir 38, such that displacement rod 34 is immersed in lubricant at the bottom of each pumping stroke, to prevent primary fluid curing and buildup on displacement rod 34.

Lubrication system 20 passively provides lubricant to valve seals and bearing seals of spray system 10, thereby preventing or reducing accumulation of cured material on valves and bearings that could otherwise damage or otherwise impair performance of spray system 10.

Discussion of Possible Embodiments

The following are non-exclusive descriptions of possible embodiments of the present invention.

A spray system comprises: a fluid source; a sprayer; a pump cylinder disposed fluidly between the fluid source and the sprayer; a plunger situated within the pump cylinder and positioned by a displacement rod; a pump motor configured to drive the displacement rod to reciprocate the plunger within the pump cylinder; first and second inlet valves situated along fluid lines from the fluid source to the pump cylinder; first and second outlet valves situated along fluid lines from the cylinder to the sprayer; valve seals disposed about the each of the first and second inlet and outlet valves; a seal lubricant reservoir for lubricant fluid; and gravity-fed valve seal lubricant lines disposed to carry the lubricant fluid to each of the valve seals.

The spray system of the preceding paragraph can optionally include, additionally and/or alternatively, any one or more of the following features, configurations and/or additional components:

A further embodiment of the foregoing spray system, further comprising: a first cylinder bearing situated at a first axial extent of the pump cylinder, adjacent to the motor, to carry the displacement rod; a second cylinder bearing situated at a second axial extent of the pump cylinder, opposite the motor, to carry the displacement rod; first and second bearing seals disposed about the first and second cylinder bearings, respectively; and first and second gravity-fed bearing seal lubricant lines disposed to carry the lubricant fluid to the first and second bearing seals, respectively.

A further embodiment of the foregoing spray system, further comprising: a rod reservoir situated at the second bearing seal, and sized and positioned to receive the displacement rod during a maximum extension of the displacement rod from the motor; and wherein the second gravity-fed bearing seal lubricant line is disposed to flood the rod reservoir with lubricant.

A further embodiment of the foregoing spray system, wherein the lubricant fluid is mixture of solvent and plasticizer.

A further embodiment of the foregoing spray system, wherein the lubricant fluid is non-hydroscopic oil.

A further embodiment of the foregoing spray system, wherein the valves are pin valves.

A further embodiment of the foregoing spray system, wherein the valves are gate valves.

A further embodiment of the foregoing spray system, further comprising a reservoir mount disposed to retain the seal lubricant reservoir at an elevated position relative to the pump cylinder.

A lubricated pumping system comprising: a metering cylinder; a plunger situated on a displacement rod within the metering cylinder; a motor attached to the displacement rod to reciprocate the plunger; a rod reservoir situated at an opposite axial extent of the metering cylinder from the motor, and sized to accept the displacement rod; a first displacement rod bearing disposed between the metering cylinder and the motor; a second displacement rod bearing disposed between the metering cylinder and the rod reservoir; first and second inlet valves situated along fluid paths from a pumping fluid source to the metering cylinder; first and second outlet valves situated along fluid paths from the metering cylinder to a pumping fluid destination; a plurality of lubricated seals disposed about each of the first and second inlet valves, the first and second outlet valves, and the first and second displacement rod bearings; and a lubricant reservoir situated at an elevated position relative to the metering cylinder, and fluidly connected to the lubricated seals.

The lubricated pumping system of the preceding paragraph can optionally include, additionally and/or alternatively, any one or more of the following features, configurations and/or additional components:

A further embodiment of the foregoing lubricated pumping system, wherein the plurality of lubricated seals are throat seals.

A further embodiment of the foregoing lubricated pumping system, wherein each of the throat seals comprise first and second seal rings disposed about a valve or bearing member, and wherein lubricant fluid from the lubricant reservoir floods a space between the first and second seal rings of each throat seal.

A further embodiment of the foregoing lubricated pumping system, wherein the lubricant reservoir is connected to the each of the plurality of throat seals via a fluid substantially vertically-oriented fluid line.

A further embodiment of the foregoing lubricated pumping system, wherein one of the plurality of lubricated seals opens into the rod reservoir to flood the rod reservoir with lubricant.

A further embodiment of the foregoing lubricated pumping system, wherein the lubricant is non-hydroscopic oil.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A spray system comprising:
a fluid source;
a fluid destination;
a pump cylinder disposed fluidly between the fluid source and the fluid destination;
a plunger situated within the pump cylinder and positioned by a displacement rod;
a pump motor configured to drive the displacement rod to reciprocate the plunger within the pump cylinder;
first and second inlet valves situated along fluid lines from the fluid source to the pump cylinder;
first and second outlet valves situated along fluid lines from the cylinder to a sprayer;
valve seals disposed about the each of the first and second inlet and outlet valves;
a seal lubricant reservoir for lubricant fluid;
gravity-fed valve seal lubricant lines disposed to carry the lubricant fluid to each of the valve seals;
a first cylinder bearing situated at a first axial extent of the pump cylinder, adjacent to the motor, to carry the displacement rod;
a second cylinder bearing situated at a second axial extent of the pump cylinder, opposite the motor, to carry the displacement rod;
first and second bearing seal assemblies respectively disposed about the first and second cylinder bearings;
first and second gravity-fed bearing seal lubricant lines disposed to carry the lubricant fluid to the first and second bearing seal assemblies, respectively; and
a rod reservoir situated at the second bearing seal assembly, and sized and positioned to receive the displacement rod during a maximum extension of the displacement rod from the motor; wherein the second gravity-fed bearing seal lubricant line is disposed to flood the rod reservoir with lubricant.

2. The spray system of claim 1, wherein the lubricant fluid is a mixture of solvent and plasticizer.

3. The spray system of claim 1, wherein the lubricant fluid is non-hygroscopic oil.

4. The spray system of claim 1, wherein the inlet valves or the outlet valves are pin valves.

5. The spray system of claim 1, wherein the inlet valves or the outlet valves are gate valves.

6. The spray system of claim 1, further comprising a reservoir mount disposed to retain the seal lubricant reservoir at an elevated position relative to the pump cylinder.

7. A lubricated pumping system comprising:
a metering cylinder;
a plunger situated on a displacement rod within the metering cylinder;
a motor attached to the displacement rod to reciprocate the plunger, and anchored to a first axial end of the metering cylinder;

a rod reservoir situated at an a second axial end of the metering cylinder opposite the first axial end of the metering cylinder, and sized to accept the displacement rod;

a first displacement rod bearing disposed against the displacement rod, between the metering cylinder and the motor;

a second displacement rod bearing disposed against the displacement rod, between the metering cylinder and the rod reservoir;

first and second inlet valves situated along fluid paths from a pumping fluid source to the metering cylinder;

first and second outlet valves situated along fluid paths from the metering cylinder to a pumping fluid destination;

a plurality of lubricated seal assemblies disposed about each of the first and second inlet valves, the first and second outlet valves, and the first and second displacement rod bearings; and a lubricant reservoir situated at an elevated position relative to the metering cylinder, and fluidly connected to the lubricated seals;

wherein at least one of the plurality of lubricated seal assemblies comprises a throat seal; and wherein one of the plurality of lubricated seal assemblies opens into the rod reservoir to flood the rod reservoir with lubricant.

8. The lubricated pumping system of claim 7, wherein the throat seal comprises a seal ring disposed about a valve or bearing member, and wherein lubricant fluid from the lubricant reservoir floods a space adjacent the throat seal.

9. The lubricated pumping system of claim 7, wherein the lubricant reservoir is connected to the throat seal via a substantially vertically-oriented fluid line.

10. The lubricated pumping system of claim 7, wherein the lubricant is non-hygroscopic oil.

* * * * *